United States Patent
Seki et al.

(10) Patent No.: US 11,906,855 B2
(45) Date of Patent: Feb. 20, 2024

(54) DISPLAY DEVICE COMPRISING A FIRST SLIT SEPARATING FIRST AND SECOND COMMON ELECTRODES AND OVERLAPPING A FIRST METAL LINE

(71) Applicant: JAPAN DISPLAY INC., Tokyo (JP)

(72) Inventors: Kenta Seki, Tokyo (JP); Gen Koide, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/076,682

(22) Filed: Dec. 7, 2022

(65) Prior Publication Data

US 2023/0108719 A1 Apr. 6, 2023

Related U.S. Application Data

(63) Continuation of application No. 17/542,967, filed on Dec. 6, 2021, now Pat. No. 11,550,190, which is a
(Continued)

(30) Foreign Application Priority Data

Feb. 24, 2016 (JP) .................................. 2016-033222

(51) Int. Cl.
*G02F 1/1343* (2006.01)
*G02F 1/1333* (2006.01)
(Continued)

(52) U.S. Cl.
CPC .... *G02F 1/134318* (2021.01); *G02F 1/13338* (2013.01); *G02F 1/133707* (2013.01);
(Continued)

(58) Field of Classification Search
CPC ......... G02F 1/134318; G02F 1/134381; G02F 1/136218; G02F 1/136295;
(Continued)

(56) References Cited

U.S. PATENT DOCUMENTS

| | | | |
|---|---|---|---|
| 6,069,678 | A | 5/2000 | Sakamoto et al. |
| 9,910,325 | B2 | 3/2018 | Seki et al. |

(Continued)

FOREIGN PATENT DOCUMENTS

| | | |
|---|---|---|
| JP | 201247801 A | 3/2012 |
| WO | 2015018168 A1 | 2/2015 |

OTHER PUBLICATIONS

1 Office Action dated Nov. 30, 2022, in corresponding Chinese Application No. 202010756751.1, 8 pages.
(Continued)

*Primary Examiner* — Paul C Lee
(74) *Attorney, Agent, or Firm* — Maier & Maier, PLLC

(57) ABSTRACT

According to one embodiment, a display device comprises image signal lines, scanning signal lines, pixels, a display area, pixel electrodes, and common electrodes. The common electrodes are configured to detect an object and to display an image in the display area. The common electrodes include first and second common electrodes which are arranged in a first direction. A first slit is provided between the first and second common electrodes. The first and second common electrodes are supplied a signal different from each other. A second slit is provided in the first common electrode. Each of the first slit and the second slit overlaps one of the image signal lines and extends in an extension direction in which the image signal line extends.

16 Claims, 10 Drawing Sheets

Related U.S. Application Data continuation of application No. 17/030,945, filed on Sep. 24, 2020, now Pat. No. 11,249,352, which is a continuation of application No. 16/732,849, filed on Jan. 2, 2020, now Pat. No. 10,824,019, which is a continuation of application No. 16/446,844, filed on Jun. 20, 2019, now Pat. No. 10,571,750, which is a continuation of application No. 15/878,092, filed on Jan. 23, 2018, now Pat. No. 10,371,981, which is a continuation of application No. 15/442,267, filed on Feb. 24, 2017, now Pat. No. 9,910,325.

(51) Int. Cl.
  *G02F 1/1337* (2006.01)
  *G02F 1/1362* (2006.01)
(52) U.S. Cl.
  CPC .. *G02F 1/134336* (2013.01); *G02F 1/136286* (2013.01); *G02F 2201/121* (2013.01)
(58) Field of Classification Search
  CPC ........ G02F 2001/134318; G02F 2001/136218; G02F 2201/122
  See application file for complete search history.

(56) References Cited

U.S. PATENT DOCUMENTS

| | | | |
|---|---|---|---|
| 10,571,750 B2 | 2/2020 | Seki et al. | |
| 10,824,019 B2* | 11/2020 | Seki | G06F 3/0412 |
| 2010/0053098 A1* | 3/2010 | Tsuzaki | G06F 3/045 345/173 |
| 2012/0050193 A1* | 3/2012 | Noguchi | G02F 1/133707 345/173 |
| 2012/0113344 A1* | 5/2012 | Kim | G02F 1/13624 445/24 |
| 2012/0274603 A1* | 11/2012 | Kim | G06F 3/0412 345/174 |
| 2014/0160066 A1* | 6/2014 | Kim | G06F 3/0445 345/174 |
| 2014/0168537 A1* | 6/2014 | Han | G06F 3/0446 349/12 |
| 2014/0184559 A1 | 7/2014 | Han et al. | |
| 2015/0212638 A1 | 7/2015 | Noguchi et al. | |
| 2016/0018693 A1 | 1/2016 | Um et al. | |
| 2018/0113541 A1 | 4/2018 | Xie et al. | |

OTHER PUBLICATIONS

Combined Chinese Office Action and Search Report dated Feb. 25, 2020, in Patent Application No. 201710100988.2, 10 pages.

\* cited by examiner

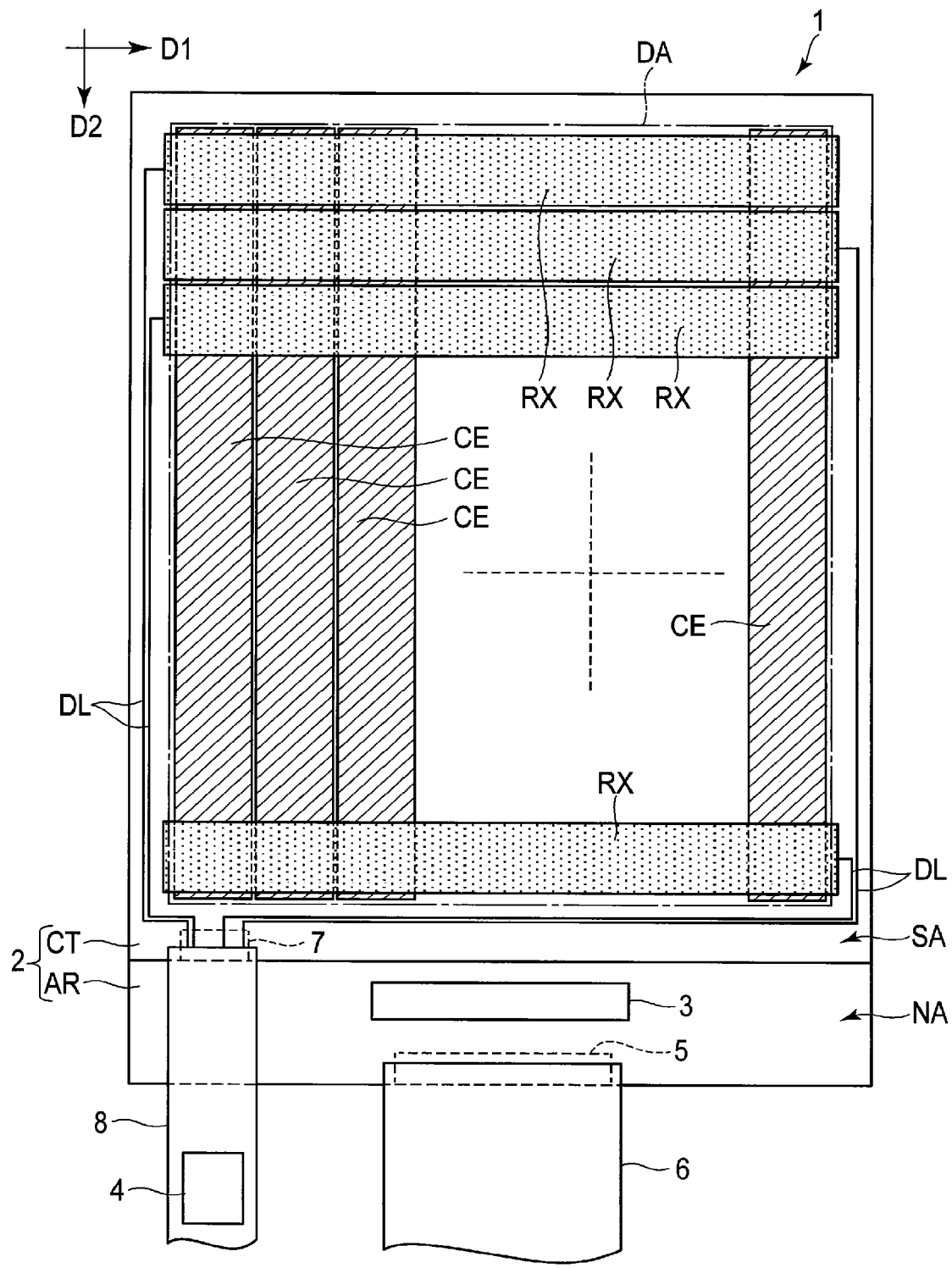
F I G. 1

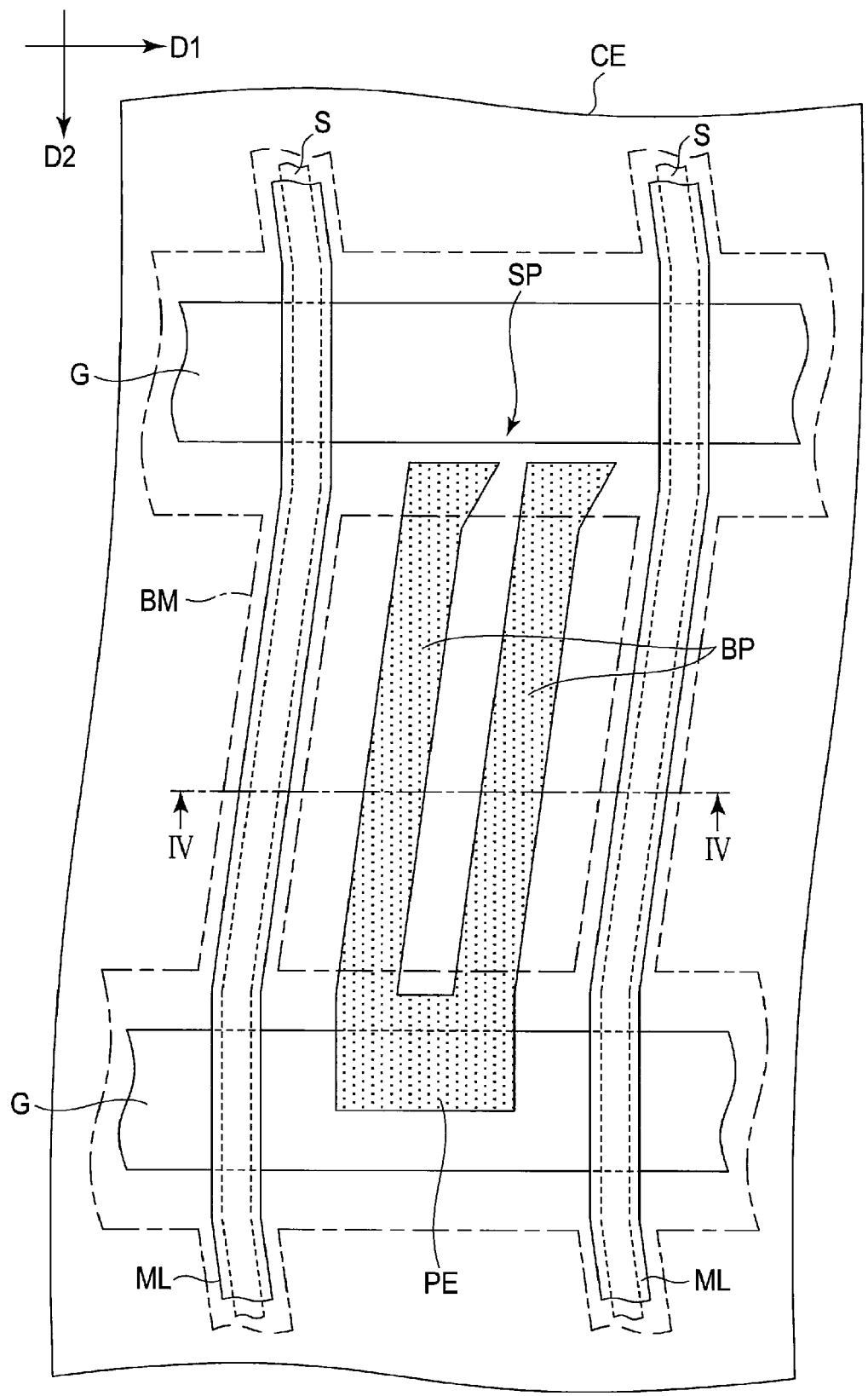
F I G. 3

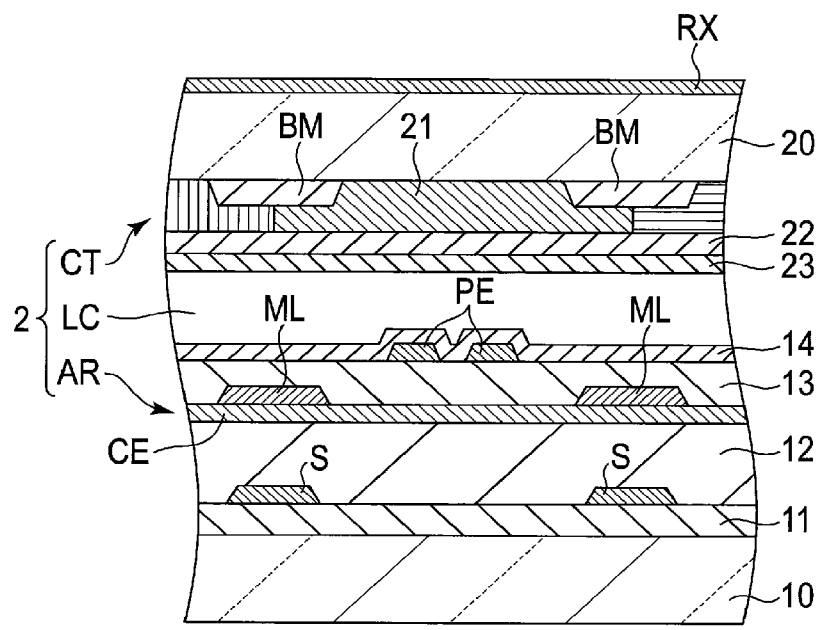
F I G. 4
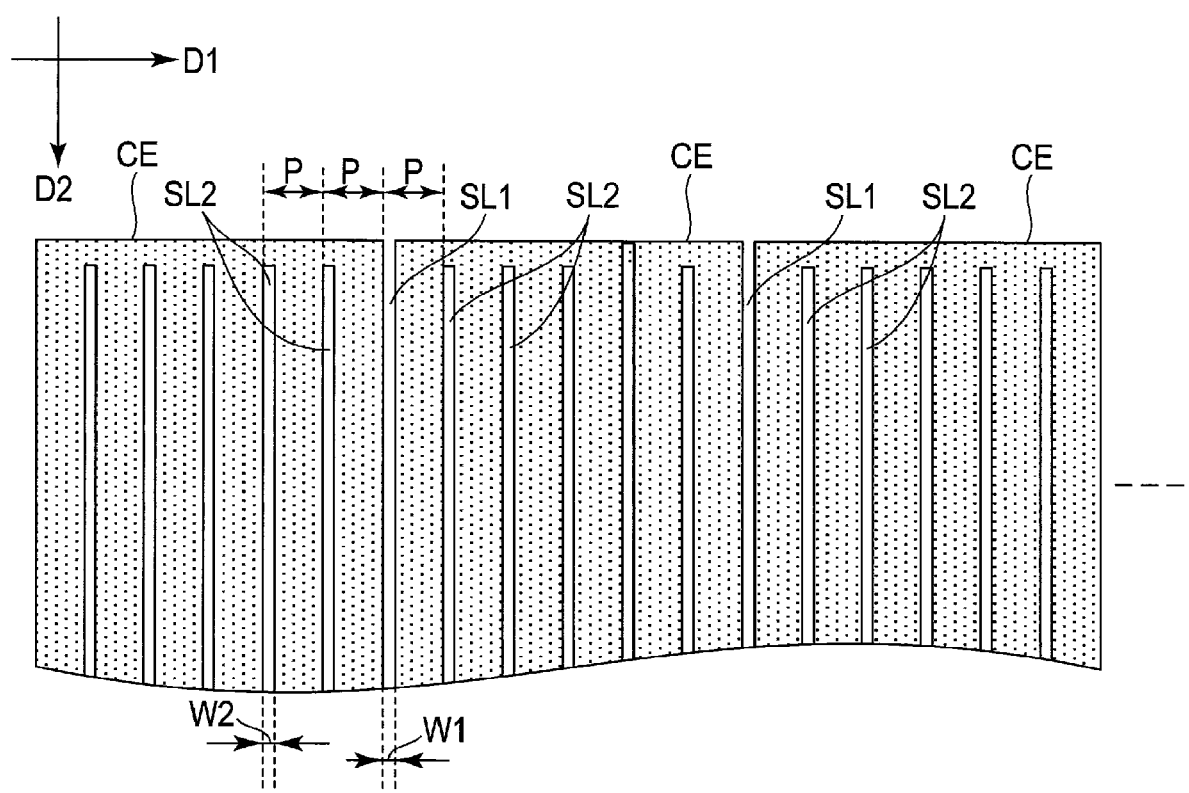
F I G. 5

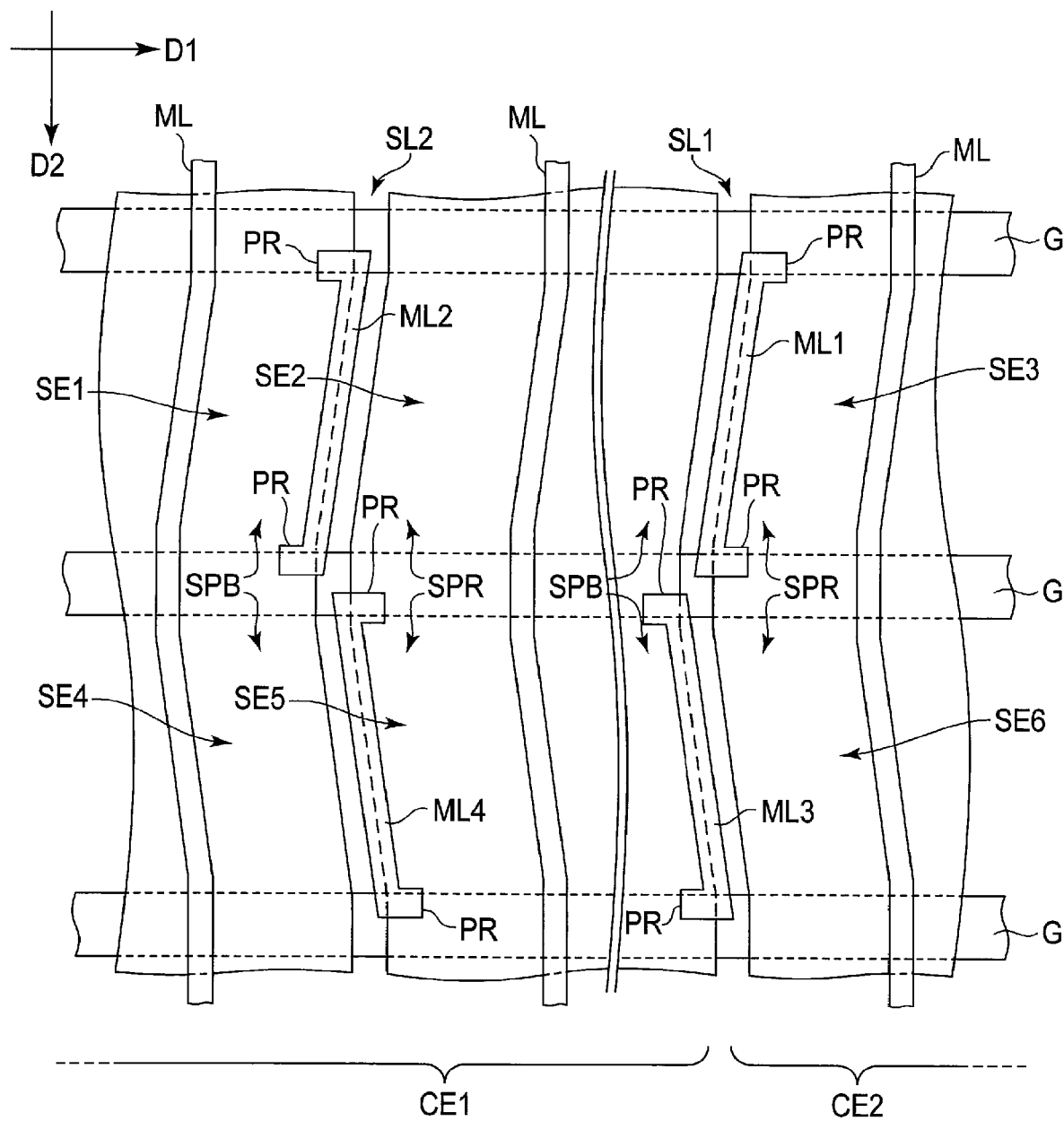
F I G. 12

DISPLAY DEVICE COMPRISING A FIRST SLIT SEPARATING FIRST AND SECOND COMMON ELECTRODES AND OVERLAPPING A FIRST METAL LINE

CROSS-REFERENCE TO RELATED APPLICATIONS

This application is a continuation of U.S. application Ser. No. 17/542,967 filed Dec. 6, 2021, which is a continuation of U.S. application Ser. No. 17/030,945 filed Sep. 24, 2020, which is a continuation of U.S. application Ser. No. 16/732,849 filed Jan. 2, 2020, which is a continuation of U.S. application Ser. No. 16/446,844 filed Jun. 20, 2019, which is a continuation of U.S. application Ser. No. 15/878,092 filed Jan. 23, 2018, which is a continuation of U.S. application Ser. No. 15/442,267, filed Feb. 24, 2017, which is based upon and claims the benefit of priority from Japanese Patent Application No. 2016-033222, filed Feb. 24, 2016, the entire contents of each of which are incorporated herein by reference.

FIELD

Embodiments described herein relate generally to a display device.

BACKGROUND

Recently, a display device which causes a common electrode which is arranged in a display area to function as a display electrode which produces an electric filed between the display electrode and a pixel electrode and also function as a detection electrode which detects an object which is in contact with or in proximity to the display area has been developed.

For example, a liquid crystal display device including a plurality of common electrodes which extend in an extension direction of scanning signal lines (gate lines), are arranged in an extension direction of image signal lines (source lines), and are used as object detection electrodes has been known. In the liquid crystal display device, slits which extend in the extension direction of the scanning signal lines are formed between the common electrodes. Between areas in which the slits are provided and areas in which the slits are not provided, the alignment of liquid crystal molecules may differ. Therefore, it is considered that, as slits are further provided in each of the common electrodes, the impact of the slits can be averaged across the display area.

In realizing common electrodes which function as detection electrodes, if the common electrodes are arranged such that the common electrodes extend in the extension direction of the image signal lines and are arranged in the extension direction of the scanning signal lines, the frame size can be reduced. In this structure, the slit between the adjacent common electrodes extends along the image signal, and thus the electric field from the image signal line may leak through the slit and may have an impact on the display performance. Therefore, even in a display device of this kind, it is still necessary to take some measures to improve display quality.

BRIEF DESCRIPTION OF THE DRAWINGS

FIG. 1 is a diagram schematically showing the structure of a display device of a first embodiment.

FIG. 3 is a plan view schematically showing an example of the structure applicable to a subpixel.

FIG. 4 is a sectional diagram taken along line IV-IV of FIG. 3.

FIG. 5 is a plan view schematically showing the shapes of a plurality of common electrodes.

FIG. 12 is a plan view schematically showing the structure of a third embodiment.

DETAILED DESCRIPTION

Figure 2:
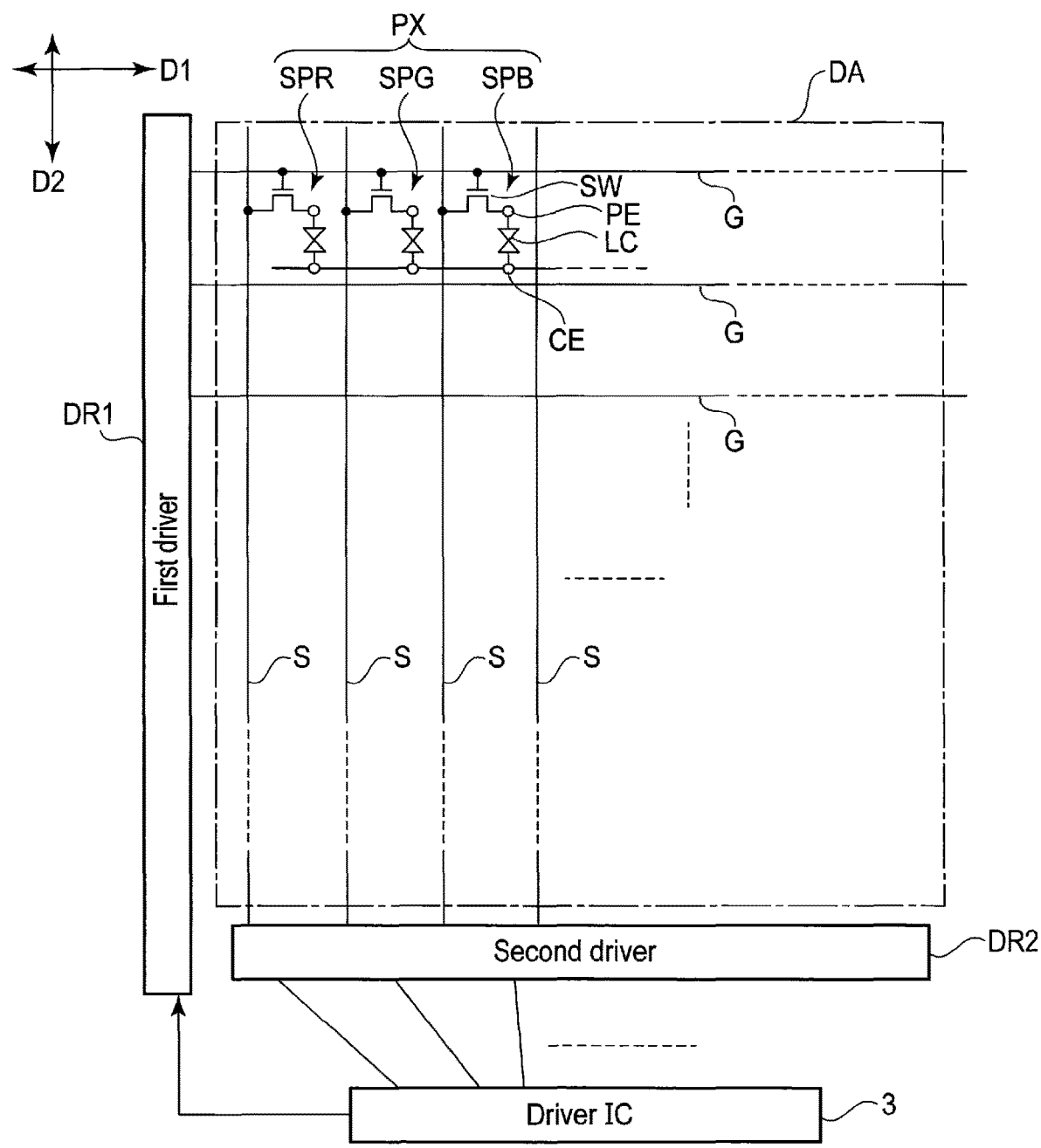
FIG. 2 is a diagram showing an equivalent circuit related to image display of the display device.

In general, according to one embodiment, a display device comprises a plurality of image signal lines, a plurality of scanning signal lines crossing the plurality of image signal lines, a plurality of pixels, a display area including the plurality of pixels, a plurality of pixel electrodes which are respectively provided in the plurality of pixels, and a plurality of common electrodes which are respectively opposed to the plurality of pixel electrodes. The plurality of common electrodes are configured to detect an object which is in contact with or in proximity to the display area and to display an image in the display area. The plurality of common electrodes include a first common electrode and a second common electrode which are arranged in a first direction in which one of the plurality of scanning signal lines extends. A first slit is provided between the first common electrode and the second common electrode. The first common electrode and the second common electrode are supplied a signal different from each other. A second slit is provided in the first common electrode. Each of the first slit and the second slit overlaps one of the image signal lines and extends in an extension direction in which the image signal line extends.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the respective parts are illustrated in the drawings schematically, rather than as an accurate representation of what is implemented. However, such schematic illustration is merely exemplary and in no way restricts the interpretation of the invention. In the drawings, reference numbers of continuously arranged elements equivalent or similar to each other are omitted in some cases. In addition, in the specification and drawings, structural elements equivalent or similar to those described in connection with preceding drawings are denoted by the same reference numbers, and detailed description thereof is omitted unless necessary.

In each embodiment, an example of the display device, a liquid crystal display device which performs a touch detection function will be described. However, the embodiment does not preclude the application of an individual technical idea disclosed in the embodiment to various other display devices. As the display device other than the liquid crystal display device, a self-luminous display device such as an organic electroluminescent display device, an electronic-paper type display device comprising an electrophoresis element or the like may be considered.

First Embodiment

FIG. 1 is a diagram schematically showing the structure of a display device 1 of the first embodiment. The display device 1 includes a display panel 2, a plurality of common electrodes CE, a plurality of detection electrodes RX which are respectively opposed to the common electrodes CE, a driver IC 3 which controls image display, and a touch detection IC 4 which controls touch detection.

The display panel 2 includes an array substrate AR (first substrate), a countersubstrate CT (second substrate) which is smaller in outer shape than the array substrate AR, and a liquid crystal layer (liquid crystal layer LC which will be described later) which is provided between these substrates AR and CT. In an area where these substrates AR and CT are opposed to each other, the display panel 2 includes a display area DA which displays an image, and a surrounding area SA outside the display area DA. Further, the array substrate AR includes a terminal area NA which is not opposed to the countersubstrate CT.

In the display area DA, the detection electrodes RX extend in a first direction D1 and are arranged in a second direction D2. In the display area DA, the common electrodes CE extend in the second direction D2 and are arranged in the first direction D1. In the present embodiment, these directions D1 and D2 are orthogonal to each other. Note that these directions D1 and D2 may also cross each at various other angles.

The driver IC 3 is provided, for example, in the terminal area NA. To the terminal area NA, a first flexible printed circuit board 6 which supplies image data to the display panel 2 is connected via a mounting terminal 5. To the end of the countersubstrate CT, a second flexible printed circuit board 8 which outputs detection signals from the detection electrodes RX is connected via a mounting terminal 7. The detection electrodes RX are connected to the mounting terminal 7 via detection lines DL which are formed in the surrounding area SA, for example.

FIG. 2 is a schematic diagram showing the equivalent circuit related to the image display of the display device 1. The display device 1 includes a first driver DR1, a second driver DR2, a plurality of scanning signal lines G which are connected to the first driver DR1, and a plurality of image signal lines S which are connected to the second driver DR2. In the display area DA, the scanning signal lines G extend in the first direction D1 and are arranged in the second direction D2. In the display area DA, the image signal lines S extend in the second direction D2 and are arranged in the first direction D1, and cross the scanning signal lines G, respectively.

Areas which are defined by the scanning signal lines G and the image signal lines S correspond to subpixels SP, respectively. In the present embodiment, one pixel PX includes a subpixel SPR which performs red display, a subpixel SPG which performs green display, and a subpixel SPB which performs blue display. Note that the pixel PX may also include a subpixel SP which performs white display or the pixel PX may also include a plurality of subpixels SP which correspond to the same color.

Each of the subpixels SP includes a switching element SW and a pixel electrode PE which is opposed to the common electrode CE. The switching element SW is electrically connected to the scanning signal line G, the image signal line S, and the pixel electrode PE. The first driver DR1 supplies a scanning signal to the scanning signal lines G, and the second driver DR2 supplies an image signal to the image signal lines S. As an electric filed which is produced between the pixel electrode PE and the common electrode CE acts on the liquid crystal layer LC, an image is displayed in the display area DA.

The common electrode CE functions not only as a display electrode but also as a detection electrode which detects an object (conductor) such as a user's finger which is in contact with or in proximity to the display area DA. In the detection operation, the driver IC 3 sequentially supplies a drive signal to the common electrodes CE. Each of the detection electrodes RX is capacitively coupled with each of the common electrodes CE. According to the drive signal which is supplied to each of the common electrodes CE, each of the detection electrodes RX outputs a detection signal. Based on the detection signal, the touch detection IC 4 detects an object which is in contact with or in proximity to the display area DA. Note that the detection method is described by way of example only and various other detection methods are also applicable. For example, an object detection method using a capacitance (self capacitance) of the detection electrode RX or the common electrode CE is also applicable.

FIG. 3 is a plan view schematically showing an example of the structure which is applicable to the subpixel SP. The subpixel SP is defined by the two adjacent scanning signal lines G and the two adjacent image signal lines S. In this example, the image signal lines S windingly extend in the second direction D2. The subpixel SP includes two branches BP which are elongated in the extension direction of the image signal line S. The pixel electrode PE does not necessarily have the above-described shape and may have more branches BP. The common electrode CE is opposed to the pixel electrode PE.

A metal line ML is provided at the boundary of the adjacent subpixels SP which are arranged in the first direction D1. The metal lines ML are opposed to the image signal lines S and extend in the extension direction of the image signal lines S. In the example shown in FIG. 3, the metal lines ML completely overlap the image signal lines S in planar view. However, the metal lines ML and the image signal lines S may partly overlap each other in planar view.

At the boundaries of the subpixels SP, a light-blocking layer BM is formed. In FIG. 3, dashed-dotted lines show the outline of the light-blocking layer BM. In planar view, the light-blocking layer BM overlaps the scanning signal lines G, the image signal lines S, and the metal lines ML, and opens in the subpixels SP.

FIG. 4 is a sectional diagram taken along line IV-IV of FIG. 3. The array substrate AR includes a first insulating substrate 10, a first insulating layer 11, a second insulating layer 12, a third insulating layer 13, a first alignment film 14, the image signal lines S, the pixel electrodes PE, and the common electrodes CE.

The first insulating layer 11 entirely covers the first insulating substrate 10. The image signal lines S are formed on the first insulating layer 11. The second insulating layer 12 covers the first insulating layer 11 and the image signal lines S. The common electrodes CE are formed on the second insulating layer 12. The metal lines ML are formed on the common electrode CE. The third insulating layer 13 covers the metal lines ML and the common electrodes CE. The pixel electrodes PE are formed on the third insulating layer 13. The first alignment film 14 covers the pixel electrodes PE and the third insulating layer 13. The pixel electrodes PE and the common electrodes CE are formed of a transparent conductive material such as indium tin oxide (ITO).

The countersubstrate CT includes a second insulating substrate 20, a color filter 21, a flattening layer 22, and a second alignment film 23, and the light-blocking layer BM. The light-blocking layer BM and the color filter 21 are formed across the entire second insulating substrate 20. The flattening layer 22 covers the color filter 21. The second alignment film 23 covers the flattening layer 22.

The liquid crystal layer LC is sealed between the first alignment film 14 and the second alignment film 23. The detection electrodes RX are formed, for example, on the outer surface of the second insulating substrate 20.

As shown in FIG. 4, the metal lines ML and the common electrodes CE are in contact with each other. In this way, the metal lines ML and the common electrode CE are electrically connected to each other. Note that the metal lines ML may also be formed between the second insulating layer 12 and the common electrodes CE.

Here, the structure of the common electrode CE will be described in detail. FIG. 5 is a plan view schematically showing the plurality of common electrodes CE which are arranged in the second direction D2. A first slit SL1 is formed between the adjacent common electrodes CE. Further, a plurality of second slits SL2 (dummy slits) are formed in each of the common electrodes CE. These slits SL1 and SL2 extend in the second direction D2 (in the extension direction of the image signal lines S) and overlap the image signal lines S in planar view.

The first slit SL1 physically separates one common electrode CE from another common electrode CE. That is, the adjacent common electrodes CE are electrically separated from each other by the first slit SL1 and supplied a signal different from each other. On the other hand, the second slits SL2 do not completely split the common electrode CE into pieces. That is, a part of the common electrode CE on the right side of the second slit SL2 and a part of the common electrode CE on the left side of the second slit LS2 are electrically connected to each other. Note that, when components are electrically separated, the components can supply different potentials.

The first slit SL1 has a width W1 in the first direction D1, and the second slit SL2 has a width W2 in the first direction D1. The width W1 and the width W2 are, for example, the same as each other. Note that, since the common electrodes CE which are adjacent to each other via the first slit SL2 must be electrically insulated from each other, the width W1 may be set to be greater than the width W2 (W1>W2).

These slits SL1 and SL2 are arranged in the first direction D1 with a pitch P. That is, the distance between the first slit SL1 and the second slit SL2 which is adjacent to the first slit SL1 is the same as the distance between the adjacent second slits SL2.

Figure 6:
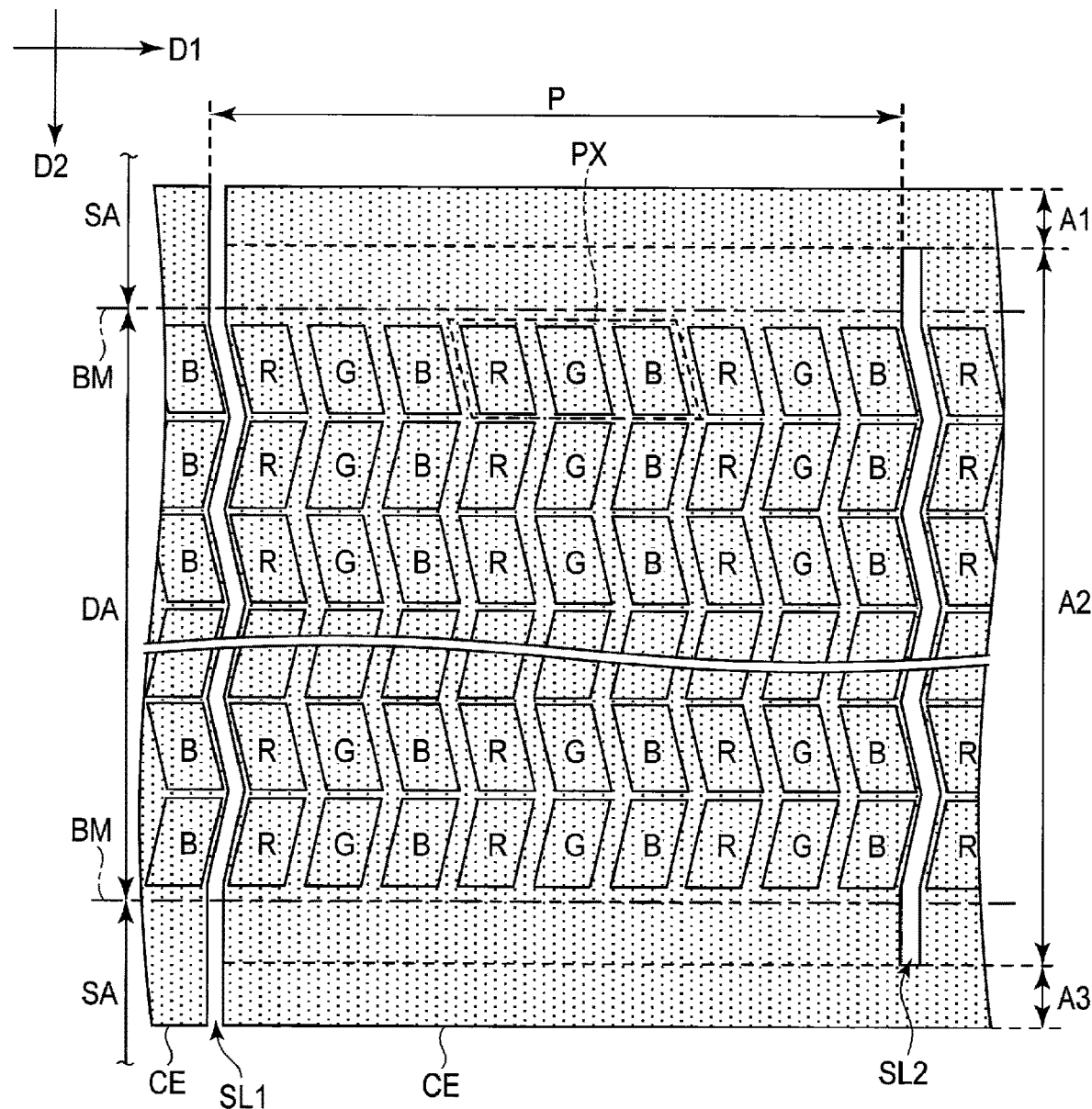
FIG. 6 is a diagram showing the detailed structures of the common electrodes.

FIG. 6 is a diagram showing the more detailed structure of the common electrode CE. In the drawing, one first slit SL1 and one second slit SL2 are illustrated. For example, as in the case of the image signal lines S shown in FIG. 3, these slits SL1 and SL2 windingly extend in the second direction D2.

In the display area DA, the pixels PX are arranged between these slits SL1 and SL2. In the example shown in FIG. 6, in the pixel PX, the subpixels SPR (R), SPG (G) and SPB (B) are arranged in the first direction D1.

These slits SL1 and SL2 are formed at the boundaries of the adjacent pixels PX which are arranged side by side in the first direction D1. Therefore, in the example shown in FIG. 6, each of the slits SL1 and SL2 extends at the boundary between the subpixel SPR and the subpixel SPB. Note that each of the slits SL1 and SL2 may extend at the boundary between the subpixels SP which correspond to other colors.

The common electrode CE includes a first area A1, a second area A2 which is adjacent to the first area A1, and a third area A3 which is adjacent to the second are A2. These areas A1 to A3 are arranged in the second direction D2. The first area A1 is located on the upper side of the surrounding area A1 (the side opposite to the terminal area NA side) in the drawing. The third area A3 is located on the lower side of the surrounding area SA (the terminal area NA side) in the drawing. The second area A2 is located in the display area DA. In the example shown in FIG. 6, the second area A2 partly extends over the upper part of the surrounding area SA and the lower part of the surrounding area SA.

In the first area A1 and the third area A3, the second slit SL2 is not formed. On the other hand, the second slit SL2 is formed in the second area A2. In this structure, the common electrodes CE which are adjacent to each other via the second slit SL2 are partly connected to each other in the upper part of the surrounding area SA and the lower part of the surrounding area SA.

The above-described light-blocking layer BM is also formed in the surrounding area SA. In FIG. 6, the dashed-dotted lines show the edges of the light-blocking layer BM which is formed in the surrounding area SA. In the drawing, the light-blocking layer BM which is formed in the display area DA is omitted. The first area A1 and the third area A3 overlap the light-blocking layer BM in planar view.

Note that the common electrodes CE which are adjacent to each other via the second slit SL2 are not necessarily connected to each other in the above-described manner. For example, these common electrodes CE may be partly connected to each other only in either of the upper part of the surrounding area SA and the lower part of the surrounding area SA or may be partly connected to each other, for example, in positions where the common electrodes CE overlap the scanning signal lines G in the display area DA.

Figure 7:
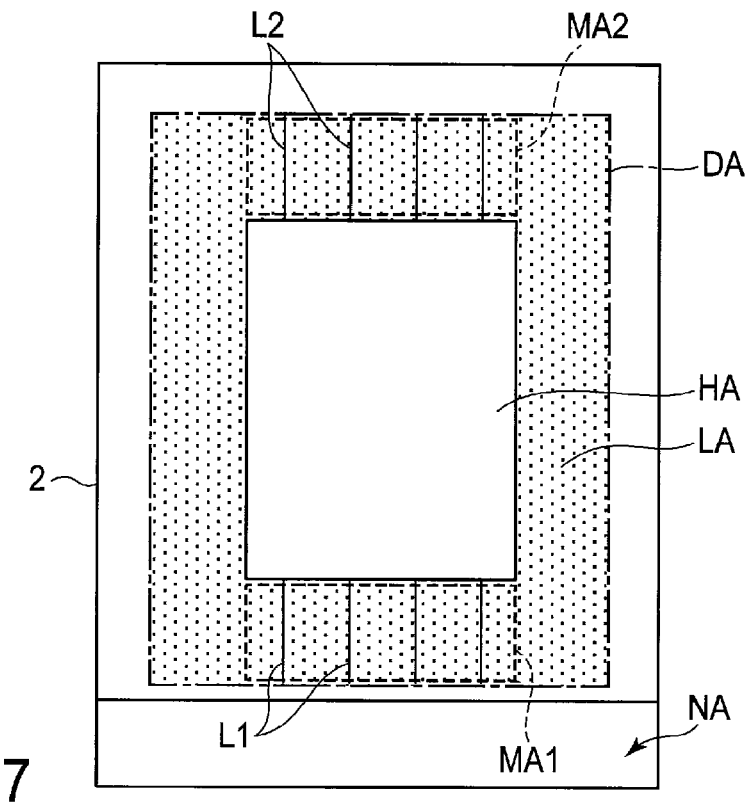
FIG. 7 is an explanatory diagram showing the impact of a slit between the common electrodes.

Here, the impact of the first slit SL1 on the display quality will be described with reference to FIG. 7. In the drawing, the planar shape of the display panel 2 is illustrated. It is assumed that, for example, a white image and a surrounding, that is, a rectangular high-luminance area HA and a low-luminance area LA are displayed in the display area DA.

As described above, the first slit SL1 overlaps the image signal line S in planar view. Therefore, an electric field is produced between the image signal line S and the pixel electrode PE via the first slit SL1, and the electric field acts on the liquid crystal layer LC. As a result, an undesirable streak may be visually recognized along the first slit SL1.

In the first slit SL1 which overlaps the image signal line S (which is assumed to be an image signal line of a blue subpixel in the present embodiment) which crosses the high-luminance area HA, the streak becomes noticeable. In the example shown in FIG. 7, steaks L1 which are created in an area MA1 below the high-luminance area HA, and streaks L2 which are created in an area MA2 above the high-luminance area HA (on the opposite side to the terminal area NA side) are illustrated. The color of light which leaks from these streaks L1 and L2 will be the halftone of the colors (red and blue in the present embodiment) of the subpixels SP which are adjacent to each other via the first slit SL1. Further, since a voltage which is applied to the image signal line S decreases with distance from the terminal area NA, an amount of the electric field which leaks from the image signal line S in the streak L2 is less than an amount of the electric field which leaks from the image signal line S in the streak L1. In this case, for example, when the low-luminance area LA is blue, the streak L1 becomes a high-intensity, bright line under the influence of the leakage of the electric field in the image signal line of the blue subpixel, and the streak L2, which is less influenced by the leakage of the electric field, becomes a lower-intensity, darker line than the line of the streak L1. Further, if the low-luminance area LA is red, the streak L1 becomes a dark line under the influence of the leakage of the electric field in the image signal line of the blue subpixel on the red display, and the streak L2, which is less influenced by the leakage of the electric field, becomes a brighter line than the line of the streak L1.

In the present embodiment, the second slits SL2 are provided between the first slits SL1. In this case, similar streaks are also created by the second slits SL2. Note that, as compared to a case where the second slits SL2 are not provided, the streaks created by these slits SL1 and SL2 are arranged with a smaller pitch (at a higher frequency). When the pitch is sufficiently small, each individual streak cannot be recognized by the viewer, and thus the impact on the image quality can be reduced.

Figure 8:
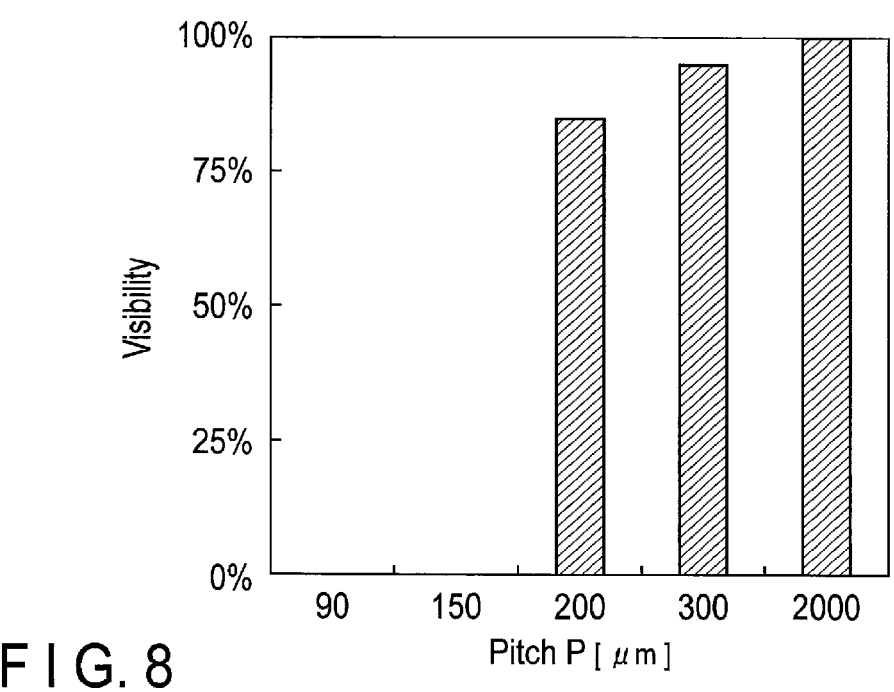
FIG. 8 is a graph showing the result of an experiment on a streak due to the slit.

The inventors have conducted an experiment and examined the relationship between the pitch P of these slits SL1 and S12 and the visibility of the streaks. FIG. 8 is a graph showing the results of the experiment. In the experiment, the pitch P was changed in several ways, and the streaks created at the respective pitches P were presented to viewers. In the graph, the horizontal axis shows the pitch P [µm], and the vertical axis shows the percentage of the viewers who could recognize the streaks (the visibility).

At a large pitch P of 2000 µm, the visibility was substantially 100%. Further, as the pitch P became smaller, the visibility decreased, and the visibility was significantly low at a pitch P of about 180 µm, and the visibility was 0% at a pitch P of 150 µm or less. As is evident from the results, each individual streak will become sufficiently invisible when the pitch P is less than or equal to 180 µm, more preferably, when the pitch P is 150 µm.

Note that, if the pitch P is too small, each individual streak will not be visually recognized, but the number of subpixels under the influence of the leakage of electric fields increases. As a result, the display color in the areas MA1 and MA2 shown in FIG. 7 may become different from the target display color. To prevent this phenomenon, the pitch P should preferably be as large as possible under the condition that the pitch P is less than or equal to 180 µm or less than or equal to 150 µm. For example, the pitch P should be greater than or equal to 80 µm. More desirably, the pitch P should be greater than or equal to 100 µm.

These slits SL1 and SL2 should preferably be formed the boundaries of the pixels PX. In this case, there is unity of color among the subpixels SP which are adjacent to each other via these slits SL1 and SL2, and thus the colors of the streaks becomes similar to each other. Therefore, when the frequency of the pitch P is increased, the visibility of the streaks can be easily decreased. Further, it is preferable that the image signal lines S which overlap these slits SL1 and SL2 are the image signal lines S which correspond to the same color. For example, both of the image signal lines S should preferably be image signal lines S of blue subpixels.

Figure 9:
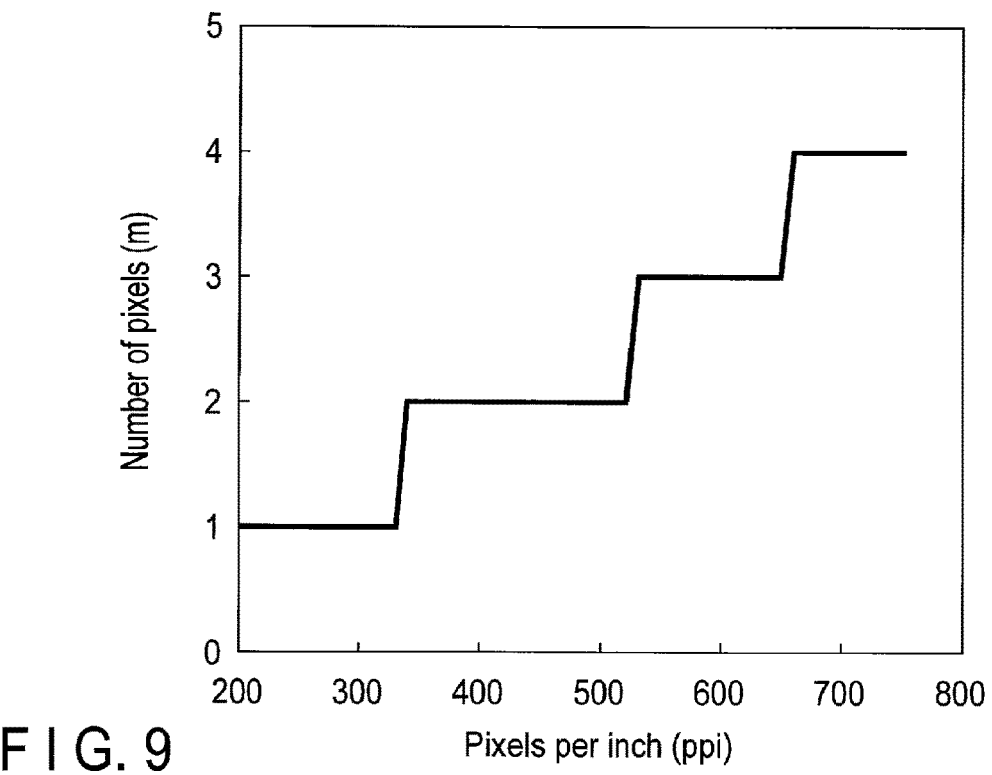
FIG. 9 is a graph showing the relationship between the performance of the display device and the number of pixels between the slits.

When these slits SL1 and SL2 are formed at the boundaries of the pixels PX, the pitch P is limited by the size of the pixel PX. FIG. 9 is a graph showing the relationship between the pixels per inch (ppi) of the display device 1 and the number (m) of the pixels PX which are arranged between these slits SL1 and SL2 or between the adjacent slits SL2. Here, the pitch P is set to be as large as possible within the range of less than or equal to 150 µm. As shown in the graph, m=1 in the case of a display device of about 350 ppi or less, and m=4 in the case of a high-definition display device of about 650 ppi or more. Further, when the pixels per inch is in between, the number of the pixels PX between the adjacent slits is set to three and then to four step by step (m=3, 4).

Here, the number of the subpixels SP which are included in the pixel PX is defined as n. In the case of forming the slits SL1 and SL2 at the boundaries of the pixels PX, the number of the subpixels SP which are arranged between the adjacent slits SL1 and SL2 and between the two adjacent second slits SL2 in the first direction D1 will be an integral multiple of n. In the present embodiment, n=3.

In the first direction D1, depending on the relationship between the number (q) of the pixels PX which overlap one common electrode CE and the number (m) of the pixels PX between the adjacent slits, the pitch P will not be constant. For example, when m=3 and if q=43, in at least one portion, the number of the pixels PX between the adjacent slits needs to be adjusted to two or four. In this case, the pitch P will not be periodic, and the streak corresponding to the adjustment will be visually recognized. Therefore, the common electrode CE should preferably have such a shape, etc., that the number (q) of the pixels PX which overlaps one common electrode CE will be an integral multiple of the number (m) of the pixels PX between the adjacent slits. In this case, the pixel P becomes constant.

The number (q) of the overlapping pixels PX may differ from one common electrode CE to another common electrode CE. In this case also, the number (q) of the overlapping pixels PX in each common electrode CE should be an integral multiple of the number (m) of the pixels PX between the adjacent slits. For example, when m=3, if the number (q1) of the pixels PX which overlap one common electrode CE is set to 42 and the number (q2) of the pixels PX which overlap the next common electrode CE is set to 45, the pitch P will be constant across these common electrodes CE.

Figure 10:
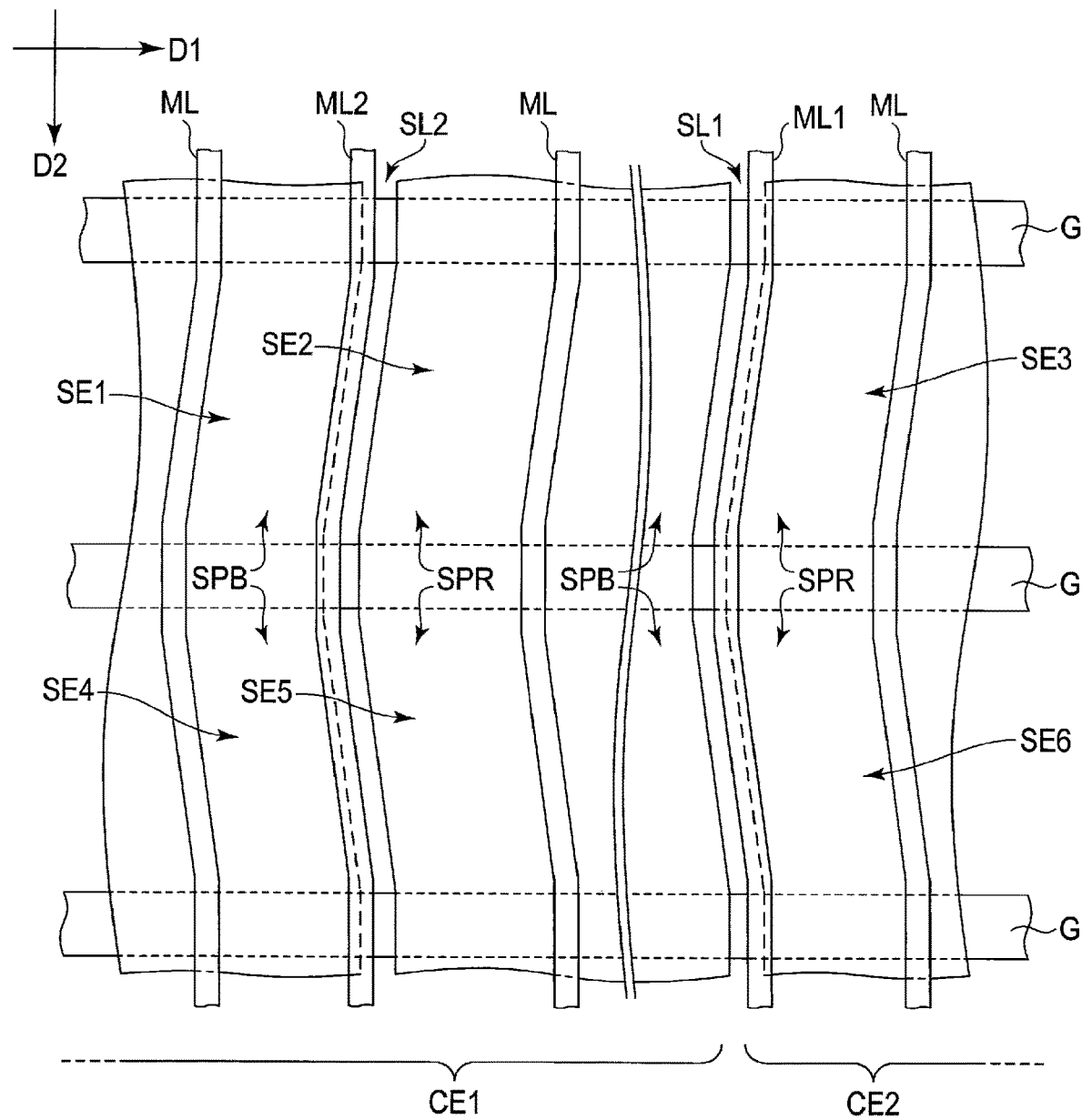
FIG. 10 is a plan view showing an example of the layout of metal lines and the common electrodes.

Subsequently, the relationship between the metal line ML and the common electrode CE will be described. FIG. 10 is a plan view schematically showing an example of the layout of the metal lines ML and the common electrodes CE. Here, two common electrodes CE and metal lines ML near three successively-arranged scanning signal lines G are partly illustrated. These two common electrodes CE are hereinafter referred to as a first common electrode CE1 and a second common electrode CE 2.

The metal lines ML are provided not only in positions where the slits SL1 and SL2 are not formed but also in positions where the slits SL1 and SL2 are formed. The metal line ML corresponding to the first slit SL1 which is provided between the common electrodes CE1 and CE2 is hereinafter referred to as a first metal line ML1, and the metal line ML corresponding to the second slit SL2 which is provided in the first common electrode CE1 is hereinafter referred to as a second metal line ML2.

The common electrode CE is composed of a plurality of structural electrodes SE. The structural electrode SE corresponds to an area which is defined by the two adjacent scanning signal lines G and the two adjacent slits (SL1 and SL2, or SL2 and SL2). In FIG. 10, six structural electrodes SE are illustrated. These structural electrodes SE are hereinafter referred to as a first structural electrode SE1 to a six structural electrode SE6.

The structural electrodes SE1, SE2, SE4 and SE5 are included in the first common electrode CE1, and the structural electrodes SE3 and SE6 are included in the second common electrode CE2. The first structural electrode SE1 and the second structural electrode SE2 are adjacent to each other via the second slit SL2. The second structural electrode SE2 and the third structural electrode SE3 are adjacent to each other via the first slit SL1. The fourth structural electrode SE4 and the fifth structural electrode SE5 are adjacent to each other via the second slit SL2. The fifth structural electrode SE5 and the sixth structural electrode SE6 are adjacent to each other via the first slit SL1. The first structural electrode SE1 and the fourth structural electrode SE4, the second structural electrode SE2 and the fifth structural electrode SE5, and the third structural electrode SE3 and the sixth structural electrode SE6 are respectively adjacent to each other in the second direction D2.

The first metal line ML1 partly covers the first slit SL1. The first metal line ML1 is in contact with the edges of the structural electrodes SE3 and SE6 and is spaced apart from the structural electrodes SE2 and SE5.

The second metal line ML2 partly covers the second slit SL2. The second metal line ML2 is in contact with the edges of the structural electrodes SE1 and SE4 and is spaced apart from the structural electrodes SE2 and SE5.

For example, the width of the first metal line ML1 which overlaps the first slit SL1 is greater than the width of the first metal line ML1 which overlaps the structural electrodes SE3 and SE6. The same also applies to the relationship of the second metal line ML2 to the second slit SL2 and to the structural electrodes SE1 and SE4. To prevent a short circuit in the common electrodes CE1 and CE2, the width of the first metal line ML1 may be slightly less than the width of the second metal line ML2 or the width of the other metal lines ML.

In the example shown in FIG. 10, subpixels on the left of the slits SL1 and SL2 are the subpixels SPB, and subpixels on the right of the slits SL1 and SL2 are the subpixels SPR. In the present embodiment, slits where the metal lines ML contact the edges of the structural electrodes SE on the subpixel SPB side and slits where the metal lines ML contact the edges of the structural electrodes SE on the subpixel SPR side are alternately arranged in the first direction D1.

Note that, although FIG. 10 only shows the layout of the metal lines ML and the common electrodes CE between the three scanning signal lines G, the metal lines ML are arranged in the same manner, for example, throughout the entire length of the metal lines ML.

If the metal lines ML are not arranged in the slits SL1 and SL2, depending on view angles with respect to the display area DA, the display color of the pixel PX may shift from the target color to another color. The color shift is caused when light in the area of the subpixel SPB which has been transmitted from the array substrate AR side is transmitted through the color filter 21 which is opposed to the subpixel SPR, or when the opposite occurs. In the present embodiment, the metal line ML which is provided in each of the slits SL1 and SL2 functions as a light-blocking layer at the boundary of the subpixels SPR and SPB and prevents such a color shift.

Further, if the metal line ML in each of the slits SL1 and SL2 is uniformly arranged besides either one of the subpixel SPR or the subpixel SPB, the color shift prevention effect will be produced in either one of the subpixel SPR and the subpixel SPB. In this respect, according to the structure of FIG. 10, since the arrangement position of the metal line ML is changed from one slit to another slit, the impact of the color shift can be evenly spread to the subpixel SPR and the subpixel SPB.

As described above, in the present embodiment, it is possible to improve the display quality of the display device 1 by providing the second slit SL2 which overlaps the image signal line S in the common electrode CE, setting the pitch P of each of the slits SL1 and SL2 in the above-described manner, and arranging the metal line ML in the above-described manner. In addition to the above, various other advantages can be achieved from the present embodiment.

Second Embodiment

The second embodiment will be described. In the present embodiment, structural elements which are the same as or are similar to those of the first embodiment will be denoted by the same reference numbers. Further, unless otherwise specified, the present embodiment has the same structure as that of the first embodiment.

Figure 11:
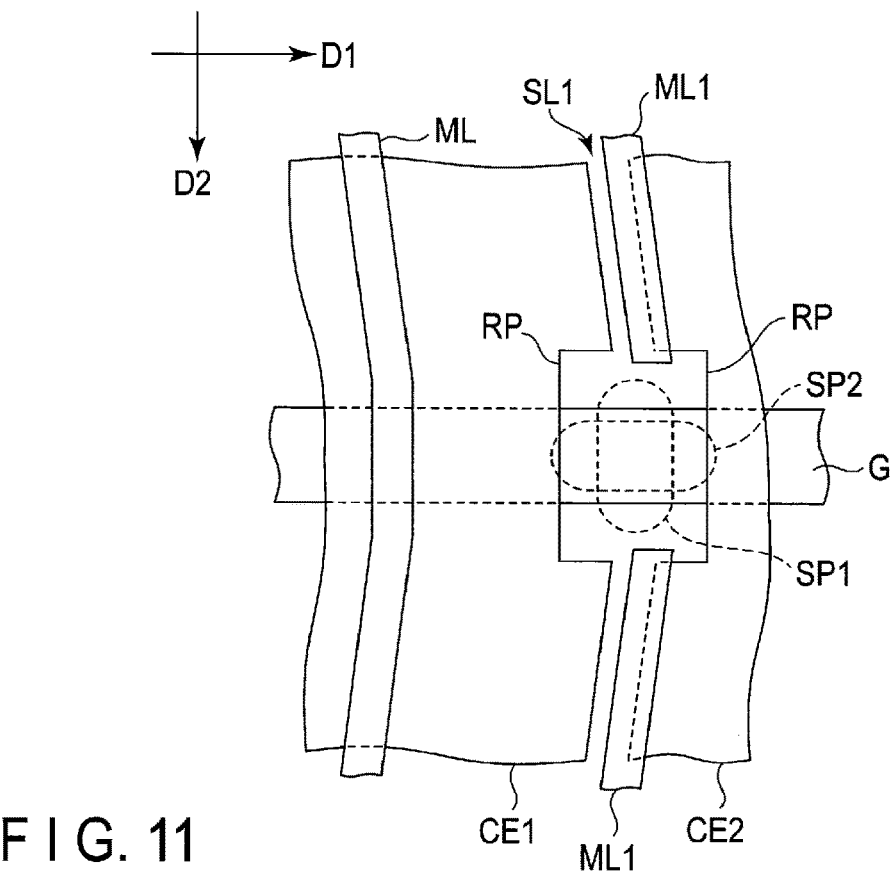
FIG. 11 is a plan view schematically showing the structure of a second embodiment.

FIG. 11 is a plan view schematically showing the structure of the second embodiment. Here, a part of the first common electrode CE1 and a part of the second common electrode CE2 which are adjacent to each other via the first slit SL1 will be mainly described.

In the display area DA, a large number of first spacers SP1 and a large number of second spacers SP2 are provided. For example, the first spacers SP1 are provided in the array substrate AR, and the second spacers SP2 are provided in the countersubstrate CT. The spacers SP1 and SP2 contact each other between the array substrate AR and the countersubstrate CT and form a cell gap between the first alignment film 14 and the second alignment film 23.

The spacers SP1 and SP2 are formed, for example, in a position where the spacers SP1 and SP2 overlap the scanning signal line G, the image signal line S, and the light-blocking layer BM in planar view. In the example shown in FIG. 11, the first spacer SP1 is elongated in the second direction D2, and the second spacer SP2 is elongated in the first direction D1. According to this design, the spacers SP1 and SP2 can have a sufficient margin for contact. Therefore, even if the spacers SP1 and SP2 are inaccurately positioned due to manufacturing errors or the countersubstrate CT and the array substrate AR are misaligned with each other due to external force, the cell gap can be excellently maintained.

In the present embodiment, the first metal line ML1 near the first slit SL basically extends continuously along the firs slit SL1 in the same manner as that of the first embodiment. However, to prevent the first metal line ML1 from overlapping the first spacer SP1 in planar view, the first metal line ML1 is disconnected near the first spacer SP1. Further, each of the common electrodes CE1 and CE2 includes a recess RP near the first spacer SP1. Since the first spacer SP1 is formed in an area which is surrounded by the recesses RP of the common electrodes CE1 and CE2, the first spacer SP1 will not overlap the common electrodes CE1 and CE2.

As in the present embodiment, when the first spacer SP1 does not overlap the common electrodes CE1 and CE2 or the first metal line ML1, the height of the first spacer SP1 can be accurately determined.

Note that, although the spacers SP1 and SP2 which overlap the first slit SL1 are mainly illustrated in FIG. 11, the same also applies to the structure near the spacers SP1 and SP2 which overlap the second slit SL2. Further, the metal line ML which does not overlap the slits SL1 and SL2 is similarly disconnected in the position corresponding to the first spacer SP1. In this case, to prevent the first spacer SP1 from overlapping the common electrode CE, the common electrode CE may be opened near the first spacer SP1.

Note that, although the cell gap is formed by the two spacers SP1 and SP2 in the present embodiment, a cell gap may also be formed by one spacer which extends from the array substrate AR or the countersubstrate CT. In this case also, a structure similar to that shown in FIG. 11 can be adopted as the structure of the spacer.

Third Embodiment

The third embodiment will be described. In the present embodiment, structural elements which are the same as or are similar to those of the first embodiment will be denoted by the same reference numbers. Further, unless otherwise specified, the present embodiment has the same structure as that of the first embodiment.

FIG. 12 is a plan view schematically showing an example of the layout of the metal lines ML and the common electrodes CE of the third embodiment. The example shown in FIG. 12 is different from the example shown in FIG. 10 in that the metal lines ML are intermittently formed near the slits SL1 and SL2.

In FIG. 12, a first metal line ML1 and a third metal line ML3 are arranged near the first slit SL1, and a second metal line ML2 and a fourth metal line ML4 are arranged near the second slit SL2. More specifically, these metal lines ML1 to ML4 are continuously formed along the slits SL1 and SL2 between the adjacent scanning signal lines G.

The metal lines ML1 and ML3 partly cover the first slit SL1. More specifically, the first metal line ML1 is in contact with the edge of the third structural electrode SE3 and is spaced apart from the second structural electrode SE2. Further, the third metal line ML3 is in contact with the edge of the fifth structural electrode SE5 and is spaced apart from the sixth structural electrode SE6.

The metal lines ML2 and ML4 partly cover the second slit SL2. More specifically, the second metal line ML2 is in contact with the edge of the first structural electrode SE1 and is spaced apart from the second structural electrode SE2. Further, the fourth metal line ML4 is in contact with the edge of the fifth structural electrode SE5 and is spaced apart from the fourth structural electrode SE4.

In the example shown in FIG. 12, projections PR are formed at both ends of each of the metal lines ML1 to ML4. The projections PR of each of the metal lines ML1 to ML4 extend toward the structural electrode SE which is in contact with each of the metal lines ML1 to ML4. Note that the projection PR may be provided at one end of each of the metal lines ML1 to ML4.

According to the above-described embodiment, in the slits SL1 and SL2, the metal lines ML provided closer to the subpixels SPR and the metal lines ML provided closer to the subpixels SPB are alternately arranged in the extension direction of the slits. Also in the first direction D1, the metal lines ML provided closer to the subpixels SPR and the metal lines ML provided closer to the subpixels SPB are alternately arranged in a manner similar to that of the example shown in FIG. 10. In this way, the arrangement positions of the metal lines ML in the slits SL1 and SL2 are evenly spread to the subpixels SPR and the subpixels SPB not only in the first direction D1 but also in the extension direction of the slits SL1 and SL2, and the color shift and the impact of the streak which is associated with the leakage of the electric field can be further suppressed.

Further, it is possible, by providing the projections PR, to ensure electrical connection between the metal lines ML and the structural electrodes SE near the slits SL1 and SL2. In this way, it becomes possible to prevent such a situation where the metal line ML does not contact the structural electrode SE due to manufacturing errors or the like, that is, the metal line ML becomes floating.

In addition to the above, the present embodiment can also achieve the same advantages as those achieved from the first embodiment.

Fourth Embodiment

The fourth embodiment will be described. In the present embodiment, structural elements which are the same as or are similar to those of the first embodiment will be denoted by the same reference numbers. Further, unless otherwise specified, the present embodiment has the same structure as that of the first embodiment.

Figure 13:
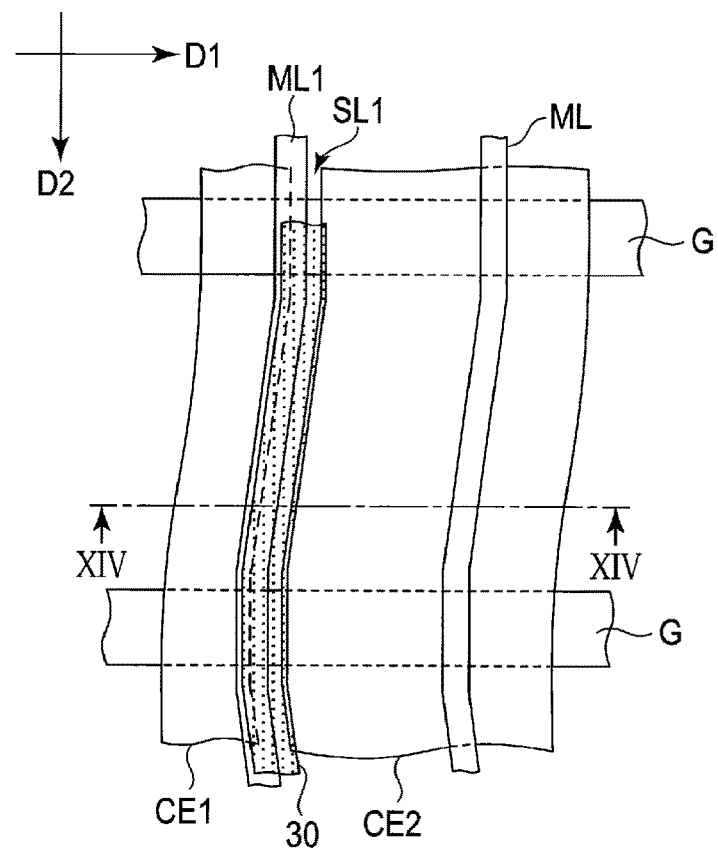
FIG. 13 is a plan view schematically showing the structure of a fourth embodiment.

FIG. 13 is a plan view schematically showing the structure of the fourth embodiment. Here, a part of the first common electrode CE1 and a part of the second common electrode CE2 which are adjacent to each other via the first slit SL1 are mainly described. In the present embodiment, a shield electrode 30 is further added to the structure of the first embodiment. The shield electrode 30 is formed of a transparent conductive material such as ITO. It is assumed that, although the shield electrode 30 has an arbitrary potential, for example, the shield electrode 30 has the same potential as that of the common electrode CE, and the common voltage is applied to the shield electrode 30.

The shield electrode 30 extends together with the first metal line ML1 in the extension direction of the image signal line G. In the example shown in FIG. 13, the shield electrode 30 overlaps the entire first slit SL1. As another example, the shield electrode 30 may overlap a part of the first slit SL which is not covered with the first metal line ML1, and may not overlap a part of the first slit SL which is covered with the first metal line ML1.

Figure 14:
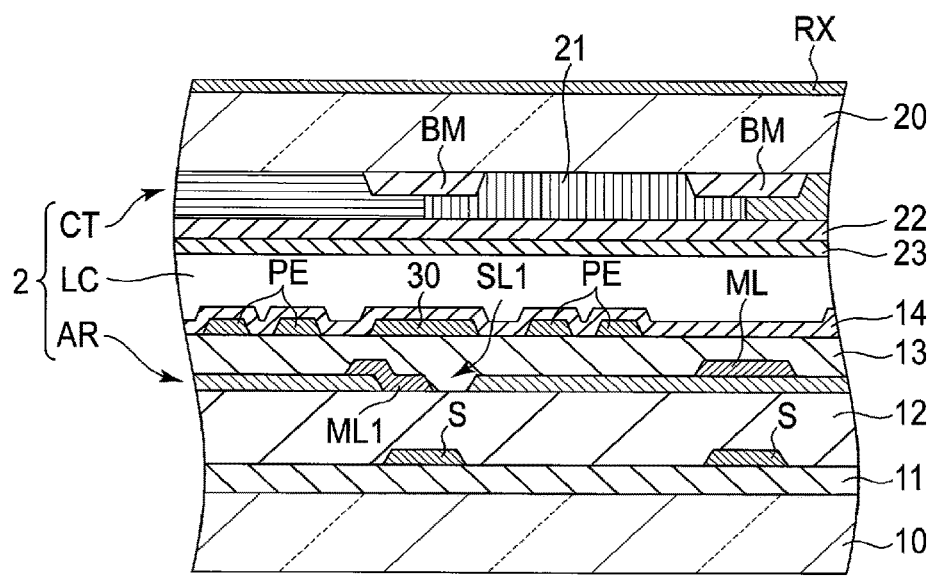
FIG. 14 is a sectional diagram taken along line XIV-XIV of FIG. 13.

FIG. 14 is a sectional diagram taken along line XIV-XIV of FIG. 13. In the example shown in the drawing, the shield electrode 30 and the pixel electrode PE are formed in the same layer, that is, between the third insulating layer 13 and the first alignment film 14. The shield electrode 30 is opposed to the light-blocking layer BM.

Note that the shield electrode 30 and the pixel electrode PE may be arranged in different layers. For example, the third insulating layer 13 may be separated into two layers, and the shield electrode 30 may be arranged between these layers. Although the structure near the first slit SL1 is mainly described with reference to FIGS. 13 and 14, the shield electrode 30 is also arranged in the second slit SL2 in the same manner.

As the shield electrode 30 is arranged according to the present embodiment, in the slits SL1 and SL2, the leakage of the electric field which is not completely prevented by the metal line ML can be prevented by the shield electrode 30. Therefore, the display quality of the display device 1 can be further improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the structure of the above-described embodiments can be appropriately combined with each other.

Further, the display device 1 which has a touch detection function has been described in the embodiments. However, the technical ideas disclosed in the embodiments are also applicable to a display device which does not have a touch detection function.

Still further, each of the slits SL1 and SL2 is arranged between the subpixels SPR and SPB in the embodiments. However, each of the slits SL1 and SL2 may also be arranged between the subpixels SPR and SPG or between the subpixels SPG and SPB.

Still further, the common electrodes CE in the embodiments may also be physically separated from each other on a structural electrode SE basis. In this case, as the structural electrodes SE are electrically connected to each other by the metal lines ML, one common electrode CE can be formed.

What is claimed is:

1. A display device comprising:
a first image signal line;
a second image signal line;
an insulating layer covering the first image signal line and the second image signal line;
a first metal line extending in parallel to the first image signal line;
a second metal line extending in parallel to the second image signal line;
a first common electrode; and
a second common electrode electrically connected to the second metal line; wherein
the first common electrode and the second common electrode are arrayed in a first direction,
the first common electrode is separated from the second common electrode by a first slit,
the second common electrode includes a second slit,
the first slit overlaps the first metal line,
the second slit overlaps the second metal line,
a distance between the first slit and the second slit is less than or equal to 180 µm,
the first image signal line and the second image signal line are in contact with the insulating layer,
the first metal line is in contact with the insulating layer at a region where the first metal line overlaps the first slit, and
the second metal line is in contact with the insulating layer at a region where the second metal line overlaps the second slit.

2. The display device of claim 1, wherein
the distance between the first slit and the second slit is greater than or equal to 80 µm.

3. The display device of claim 1, wherein
the distance between the first slit and the second slit is greater than 100 µm and less than 150 µm.

4. The display device of claim 1, wherein
the first slit completely splits the first common electrode and the second common electrode, and
the second slit does not completely split the second common electrode.

5. The display device of claim 4, further comprising a plurality of pixels, wherein
the plurality of pixels includes a first subpixel, a second subpixel adjacent to the first subpixel in the first direction, a third subpixel, and a fourth subpixel adjacent to the third subpixel in the first direction,
the first slit is arranged between the first subpixel and the second subpixel, and
the second slit is arranged between the third subpixel and the fourth subpixel.

6. The display device of claim 5, wherein
each of the first subpixel and the third subpixel is a red color subpixel, and
each of the second subpixel and the fourth subpixel is a blue color subpixel.

7. The display device of claim 5, wherein
each of the first subpixel and the third subpixel is a red color subpixel, and
each of the second subpixel and the fourth subpixel is a green color subpixel.

8. The display device of claim 5, wherein
each of the first subpixel and the third subpixel is a green color subpixel, and
each of the second subpixel and the fourth subpixel is a blue color subpixel.

9. The display device of claim 4, wherein
the first slit extends parallel to the first metal line, and
the second slit extends parallel to the second metal line.

10. The display device of claim 9, wherein
the first slit has a first width in the first direction,
the first metal line has a second width in the first direction,
a center of the second width of the first metal line is shifted from a center of the first width of the first slit, and
a part of the first slit is exposed form the first metal line.

11. The display device of claim 10, wherein
the second slit has a third width in the first direction,
the second metal line has a fourth width in the first direction,
a center of the fourth width of the second metal line is shifted from a center of the third width of the second slit, and
a part of the second slit is exposed from the second metal line.

12. The display device of claim 4, further comprising:
a plurality of pixels in a display area, wherein
the second slit extends to a surrounding area outside the display area, and
an edge of the second slit is located at the surrounding area.

13. The display device of claim 4, further comprising:
a spacer, wherein
the spacer overlaps the first slit,
the first common electrode includes a recess, and
the second common electrode includes a recess,
the spacer is surrounded by the recess of the first common electrode and the recess of the second common electrode, and
the spacer does not overlap the first common electrode and the second common electrode.

14. The display device of claim 4, further comprising:
a plurality of switching elements in a display area, wherein
each of the first image signal line and the second image signal line is connected to the respective switching element in the display area, and
none of the plurality of switching elements is connected to the first metal line and the second metal line in the display area.

15. The display device of claim 4, wherein a common voltage is supplied to the first metal line and the second metal line.

16. The display device of claim 14, further comprising:
a plurality of scanning lines arrayed in a second direction intersecting with the first direction, wherein
the first slit includes a first part extending in a third direction and a second part extending in a fourth direction,
the third direction is a direction crossing the second direction at a first acute angel in a clockwise direction,
the fourth direction is a direction crossing the second direction at a second acute angle in a counter-clockwise direction,
a first part of the first metal line extends in parallel to the first part of the first slit, and
a second part of the first metal line extends in parallel to the second part of the first slit.

* * * * *